July 22, 1952 W. C. DILLON ET AL 2,604,544

CARRIER TELEPHONE SYSTEM WITH AUDIO-FREQUENCY SIGNALING

Filed Dec. 30, 1949 7 Sheets-Sheet 1

Inventors:
William C. Dillon,
Clarence H. Kehm,
By Schroeder, Merriam, Hofgren & Brady. Attys.

CARRIER TELEPHONE SYSTEM WITH AUDIO-FREQUENCY SIGNALING

Inventors:
William C. Dillon,
Clarence H. Kehm,
By Schroeder, Merriam, Hofgren & Brady Attys.

CARRIER TELEPHONE SYSTEM WITH AUDIO-FREQUENCY SIGNALING

Filed Dec. 30, 1949

Inventors:
William C. Dillon,
Clarence H. Kehm,
By Schroeder, Merriam
Hofgren & Brady. Attys.

CARRIER TELEPHONE SYSTEM WITH AUDIO-FREQUENCY SIGNALING

Inventors:
William C. Dillon,
Clarence H. Kehm,
By Schroeder, Merriam
Hofgren & Brady Attys.

CARRIER TELEPHONE SYSTEM WITH AUDIO-FREQUENCY SIGNALING

Filed Dec. 30, 1949 7 Sheets-Sheet 5

Inventors
William C. Dillon,
Clarence H. Kehm,
By Schroeder, Merriam
Hofgren & Brady.
Attys.

CARRIER TELEPHONE SYSTEM WITH AUDIO-FREQUENCY SIGNALING

Filed Dec. 30, 1949 7 Sheets-Sheet 6

Inventors:
William C. Dillon.
Clarence H. Kehm.
By Schroeder, Merriam Hofgren & Brady.
Attorneys.

Inventors.
William C. Dillon.
Clarence H. Kehm.
Schroeder, Merriam
By. Hofgren & Brady.
Attorneys.

Patented July 22, 1952 2,604,544

UNITED STATES PATENT OFFICE 2,604,544

CARRIER TELEPHONE SYSTEM WITH AUDIO-FREQUENCY SIGNALING

William C. Dillon and Clarence H. Kehm, Chicago, Ill., assignors to W. C. Dillon & Company, Inc., a corporation of Illinois Application December 30, 1949, Serial No. 135,974

23 Claims. (Cl. 179—84)

This invention relates to a telephonic communication system, and more particularly to such a communication system having improved signaling means.

This application is a division and continuation-in-part of our copending application entitled "Telephonic Communication System," filed June 6, 1946, as Ser. No. 674,750, now Patent No. 2,535,750, granted December 26, 1950.

While carrier systems have heretofore been used on toll lines, all prior art carrier telephone systems known to us have been impractical for local lines in that they required complicated equipment and local power supplies at each end of the transmission line. While it may be practical to have multi-stage tube amplifiers and their associated power supplies in the central stations of two cities spaced several hundred miles apart, it is not practical to place multi-tube units requiring power supplies in the home of each subscriber on a local line, as the necessity for local power paid for by the subscriber rather than the telephone company would be an undesirable factor from the standpoint of public acceptance, and the servicing required by complicated electronic equipment would render the maintenance of such a local system practically prohibitive. This is particularly true of rural telephone circuits where a single circuit would normally have twenty or twenty-five subscribers spaced over quite a distance, the problem being further complicated by the fact that many rural areas have no source of commercial electric power.

In the above mentioned copending application we disclosed a carrier telephone system which requires no batteries, tubes or other complicated electronic equipment at the subscriber's home, and in which all the electronic equipment is located in the central station and all of the power requirements of the system are supplied from the central point. The result is a telephone system which is particularly adaptable for rural areas or small towns, and which provides the satisfactory service of a single party city line at the same time enabling a large number of subscribers, as for example twenty-five subscribers, to be connected to a conventional local circuit of the party-line type.

In addition to the provision of simple and rugged equipment at the subscriber's home, requiring no local power supply, and the providing of complete privacy of communication channels on a multi-party line, our system is further particularly advantageous in that it can be connected into a conventional telephone switchboard, the calls can be handled in conventional manner by the switchboard operator, and interconnections between subscribers on circuits employing our system and subscribers on the more conventional battery circuits, can be made without any special operations being required. That is, a subscriber on a local line employing our carrier system can be connected to another subscriber on the same line, another subscriber on another carrier line local circuit, a subscriber in a town or city circuit on the conventional battery operated telephone line, or to a toll circuit by the conventional cord and plug operations, the signals on the board likewise being conventional in all phases of the operation.

The present application is concerned with improved means for signaling at the subscriber's station and for modulating the transmission line at the subscriber's station.

One feature of our invention is that it provides improved signaling apparatus; another feature of the invention is that it provides a signal and ringing arrangement enabling the operator, through the same operation at the switchboard, to signal a subscriber on one of our carrier circuits or on a conventional battery circuit; another feature of the invention is that transducer means at the subscriber's local station may be energized by power from the central station without the provision of special power leads between the stations; a further feature of the invention is in effecting signaling of the subscriber by utilizing a signaling frequency in the audible range delivered to a transducer element at the subscriber's station; another feature is the using of a frequency at which the receiver diaphragm is resonant, if the diaphragm is used as the transducer element during signaling; still another feature of the invention is in effecting signaling through a small speaker at the subscriber's station, the speaker being energized by power from the central station; yet a further feature of the invention is that the speaker may be mounted in conventional telephone apparatus; an additional feature of the invention is that effective signaling may be provided by utilizing a signaling tone of varying frequency; and yet a further feature of the invention is that it provides a novel method of modulation of the transmission line from the subscriber's station.

Other features and advantages of the invention will be apparent from the following specification and drawings, in which.

Figure 1:
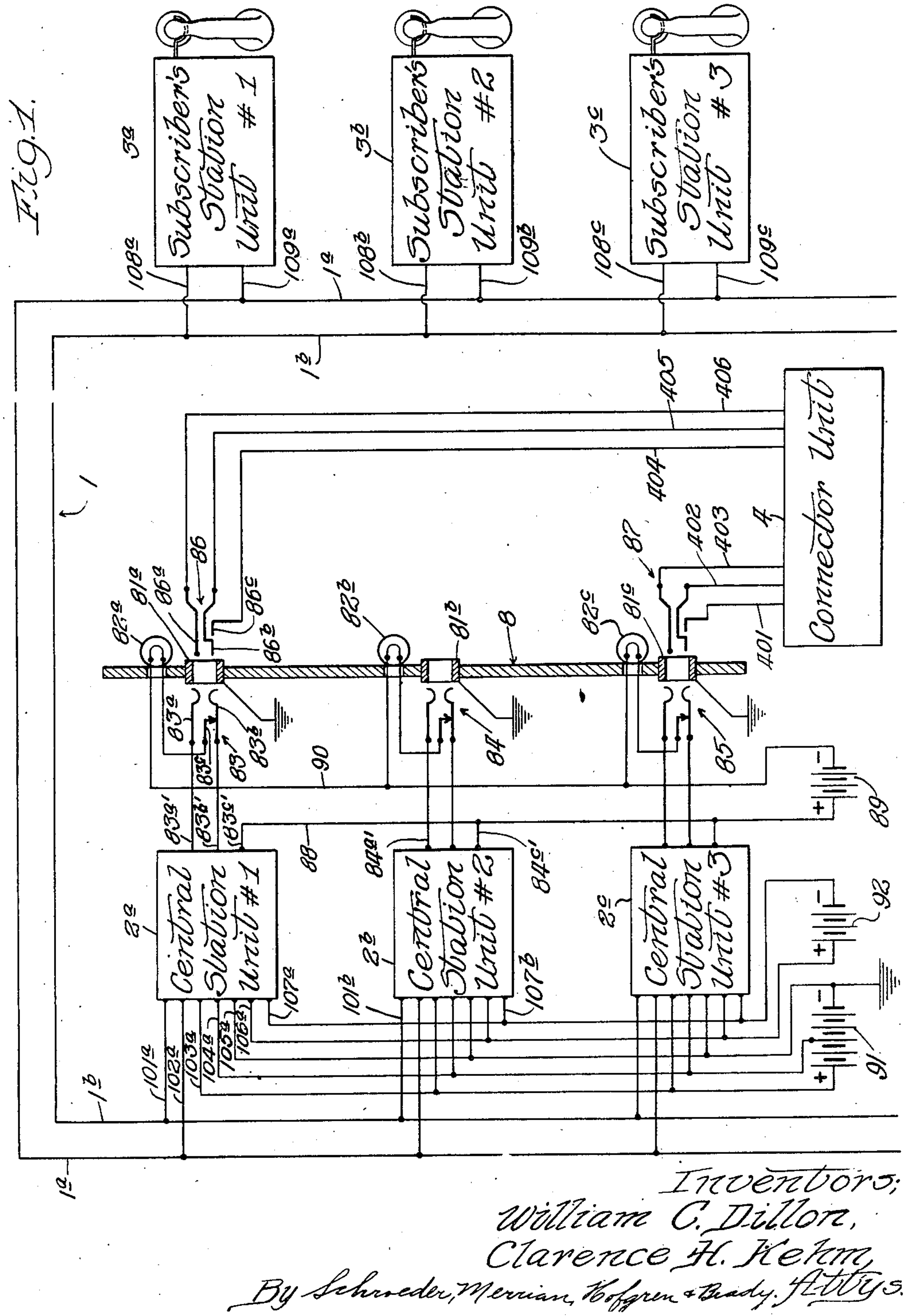
Fig. 1 is a schematic diagram of a portion of a telephone system embodying our inventions, three central station units and three subscriber's units being illustrated as merely representative of the very much larger number of units which would ordinarily be associated with each transmission line or circuit.

The present invention discloses novel signaling means for use with a carrier telephone system. Inasmuch as conventional ringing operations are not feasible on a carrier system, we signal the subscribers on a telephone circuit employing our system by providing an audio frequency wave at the central station, and by utilizing this wave to actuate a transducer at the subscriber's station to provide an audible signal. We may utilize the receiver diaphragm at the subscriber's station as a transducer for signaling, and in this event the diaphragm preferably is resonant at the same frequency as the frequency of the actuating audio wave so that the diaphragm "howls" to provide a loud audible signal. Another means of signaling is by utilizing a small loudspeaker which may be mounted in the base of the subscriber's telephone and which is actuated by the audio frequency wave. In this event the audio actuating wave may be a fixed frequency or may be continuously varied between upper and lower limits within the audio range to provide a more attention-compelling signal.

With either of the signaling means disclosed above no local source of power is needed at the subscriber's station, and signaling is completely private because the signal wave is impressed upon a carrier wave which affects only one subscriber's station. The stations of all other subscribers on the line have filters which block out all but one carrier wave, and a different carrier frequency is used for each subscriber's station. Inasmuch as the signaling voltage is provided as a modulation effect on a carrier wave it will not affect conventional battery circuits operating from the same central station, and in the event a resonant receiver diaphragm is used at the subscriber's station, this diaphragm is preferably chosen to be resonant at a frequency other than the resonant frequency of receiver diaphragms in battery or toll circuits operated from the same central station.

Before entering upon a detailed description of our system, with references to the drawings, it is felt desirable briefly to describe our system and its operation in general terms.

In a telephone circuit making use of our invention, as for example a rural party line circuit, the central station includes what we are terming a central station unit for each subscriber on the line, as for example each of twenty-five subscribers. The central station units each contain means for continuously supplying carrier waves to the line, as an oscillator, each unit providing carrier waves of a predetermined different frequency, and in addition each unit includes filter means, rectifying means, modulator-demodulator means, an induction coil, and a receiver and microphone. The equipment required at the subscriber's station is of such a character that the microphone and receiver may be combined in a hand set of a conventional cradle phone unit, and all of the other parts may be incorporated in the base of such a unit. The connector unit associated with the cords at the switchboard must contain, in addition to the conventional cam switches, relays and the like, our special combined ringing and signaling arrangement.

We prefer to employ carrier waves of predetermined spaced frequencies starting immediately above the audible range, as for example 19,000 cycles per second. As the voice frequencies used in telephone circuits practically never exceed 2,000 c. p. s. and are normally of the order of 1,000 c. p. s. or lower, the spacing between carrier channels need not be great even if both sidebands are associated with the carriers, it having been our experience that 4,000 cycles spacing between the carriers is very satisfactory. For example, the carrier supply or generating means associated with central station unit #1 may provide carrier waves having a frequency of 19,000 c. p. s. and the filter of central station unit #1 and subscriber's station #1 would both be tuned to this same frequency and adapted to pass at least 1,000 cycles on each side of this center frequency while providing considerable attenuation of frequencies several thousand cycles away. The carrier supplying means associated with central station unit #2 might provide carrier waves of a frequency of 23,000 c. p. s., and the filter of this unit and the corresponding subscriber's unit would be tuned to this same frequency. Central station unit #3 might be designated to operate at 27,000 c. p. s., and other units on the same line might operate at different predetermined spaced frequencies.

When the receiver at subscriber's unit #1 is lifted, closing of the switch means resulting from this action operates the indicator lamp on the switchboard associated with the central station unit #1, lifting of the receiver effecting variation of a condition in the transmission line, as its effective inductance, which operates only through central station unit #1 because this is the only unit tuned to the frequency affected by anything in subscriber's unit #1. When the operator plugs into the jack on the switchboard associated with the central station #1 the light goes out in conventional manner, and conversation can then be carried on between subscriber #1 and the operator by modulating and demodulating the 19,000 cycle carrier wave, the conversation being private since this frequency will not actuate any other subscriber's unit, all of the other units on the line having their filters tuned to other frequencies. When the subscriber has indicated whom he wishes to reach, the operator would then plug the corresponding cord into a jack on another similar carrier circuit, the same circuit, a battery operated circuit in the town in which the central station is located, or a toll circuit, as may be desired. If the party desired is on the same or another circuit within the same operator's jurisdiction, she would then ring or signal the other party and close her keys to permit the conversation to take place.

If subscriber #1 wished to talk to subscriber #3 on the same line, for example, voice waves at the microphone of subscriber #1 would modulate the 19,000 cycle carrier, would travel along to central station unit #1 at this carrier frequency, would be demodulated there, would pass through the jacks, cords, and connector unit at voice frequency, would modulate the 27,000 cycle carrier at central station unit #3, and then travel back along the transmission line to subscriber's station unit #3, where they would be demodulated and actuate the receiver at this unit. When subscriber #3 spoke into his mouthpiece the reverse would take place, the waves first traveling along the transmission line as a modulation effect on a 27,000 cycle carrier and then returning to subscriber #1 as a modulation effect on a 19,000 cycle carrier. On the other hand, if subscriber #1 were talking to a shopkeeper in town on a conventional battery circuit this subscriber's voice waves would travel in to the central station as modulation effects on his 19,000 cycle carrier, would be demodulated in central station unit #1, and would then travel at voice frequencies through the board and the battery circuit in town to the shopkeeper's ears, the reverse being true when the shopkeeper spoke.

As indicated earlier, and as provided in the system of Figs. 1–4, we may signal the subscribers on a telephone circuit employing our system by vibrating the receiver diaphragm at its frequency of mechanical resonance to set up a "howling" which may be made even louder than a conventional bell if desired. While different receivers may have diaphragms with different frequencies of mechanical resonance, we prefer to use receivers of a single make and type all having substantially identical resonant frequencies, as for example 400 vibrations per second. We then parallel the conventional ringing generator at the central station with another signaling generator (providing suitable choke means to prevent these generators from shorting each other), so that when the operator opens the ringing key both the conventional ringing frequency (as for example 16 or 32 cycles per second) and the "howling" frequency (as for example 400 cycles per second) go on to the line. The "howling" frequency should preferably be different than the natural frequency of the receivers on battery circuits operated from the same central station, so that the conventional bell ringing will take place on these circuits; whereas on the carrier circuits utilizing our inventions the very low bell ringing frequency will effect no action whatsoever at any of the subscriber's stations, and the "howling" signal will vibrate the receiver diaphragm only at the station tuned to the carrier frequency associated with the central station unit through which the call is being completed, making signaling as well as communication private even though a single pair of wires providing the party line may have as many as twenty-five or thirty subscribers connected thereto.

Figs. 5–8 show a system wherein we utilize a small speaker at each subscriber's station and actuate the speaker by an audio note which may be of a frequency similar to that described above. With such an arrangement the speaker may be mounted in the base portion of conventional telephone apparatus, the dial mechanism being removed and the speaker being inserted in place thereof. When a speaker is used for signaling purposes more effective signaling may be obtained by utilizing a signaling tone of varying frequency, such a varying tone being more effective in attracting the attention at the subscriber's station.

Figure 2:
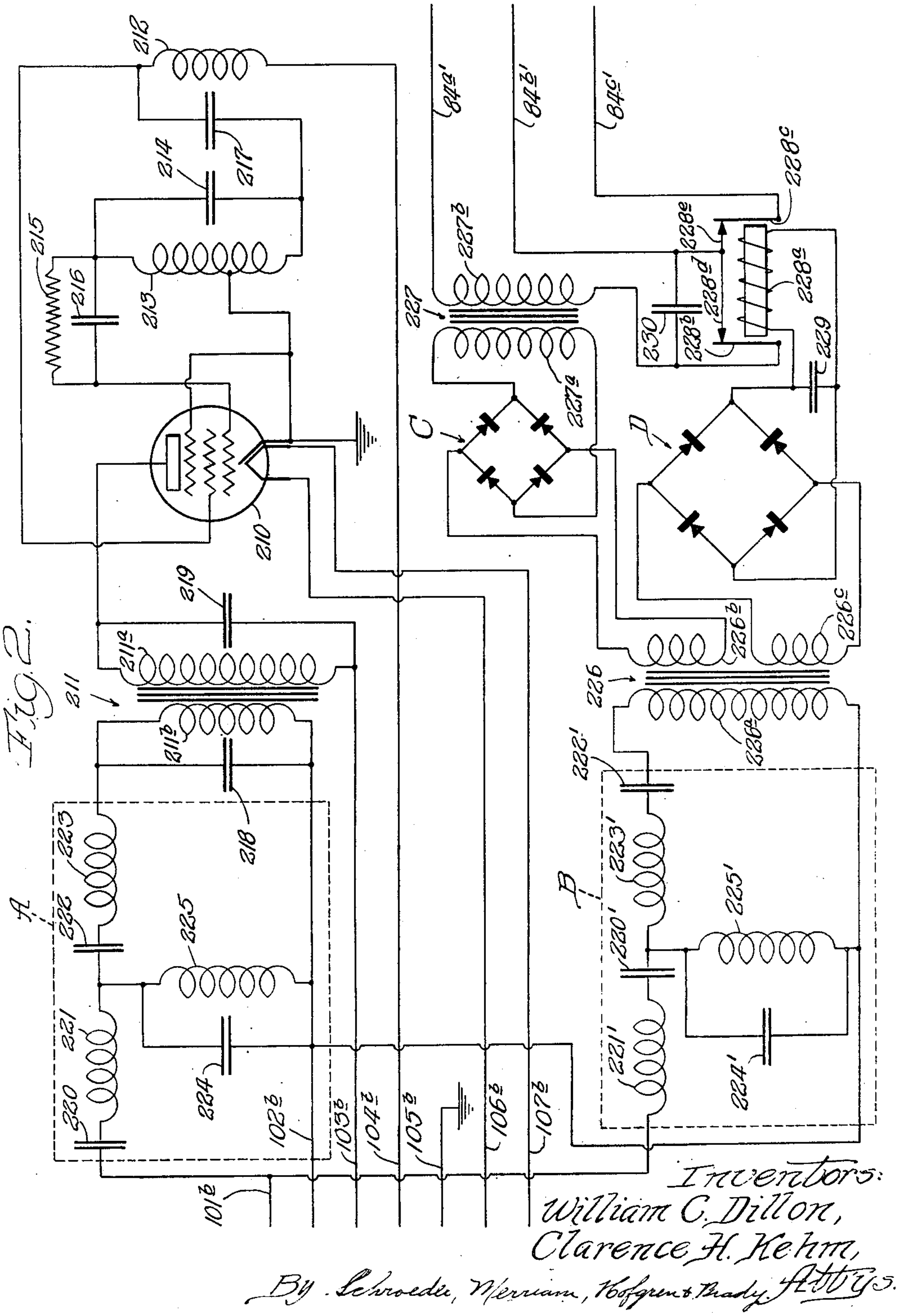
Fig. 2 is a circuit diagram illustrating one form of central station unit which may be used with the apparatus of Fig. 1.
Figure 3:
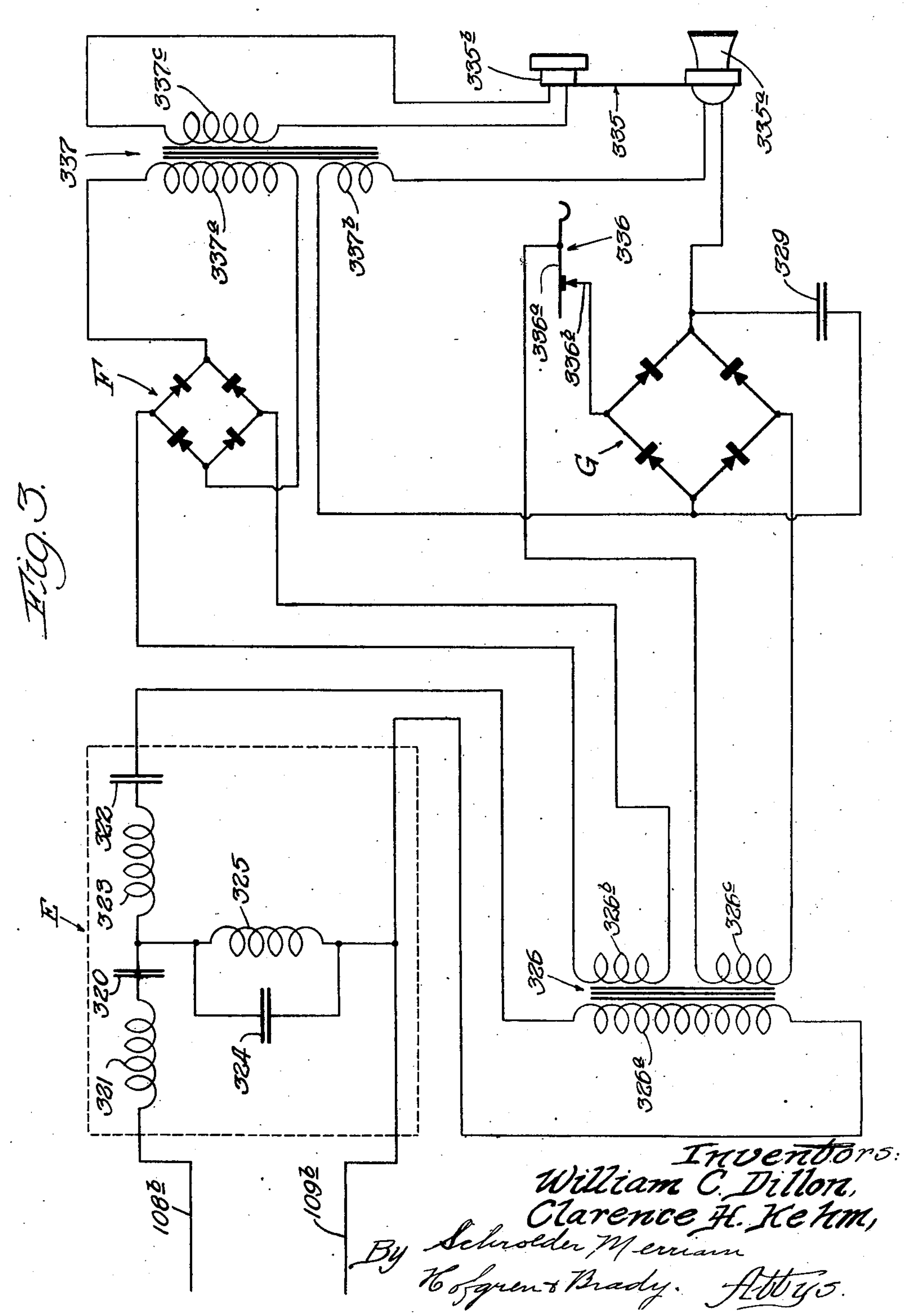
Fig. 3 is a circuit diagram of a form of subscriber's station unit which might be used in conjunction with central station units of the character shown in Fig. 2 in a system of the kind shown in Fig. 1.
Figure 6:
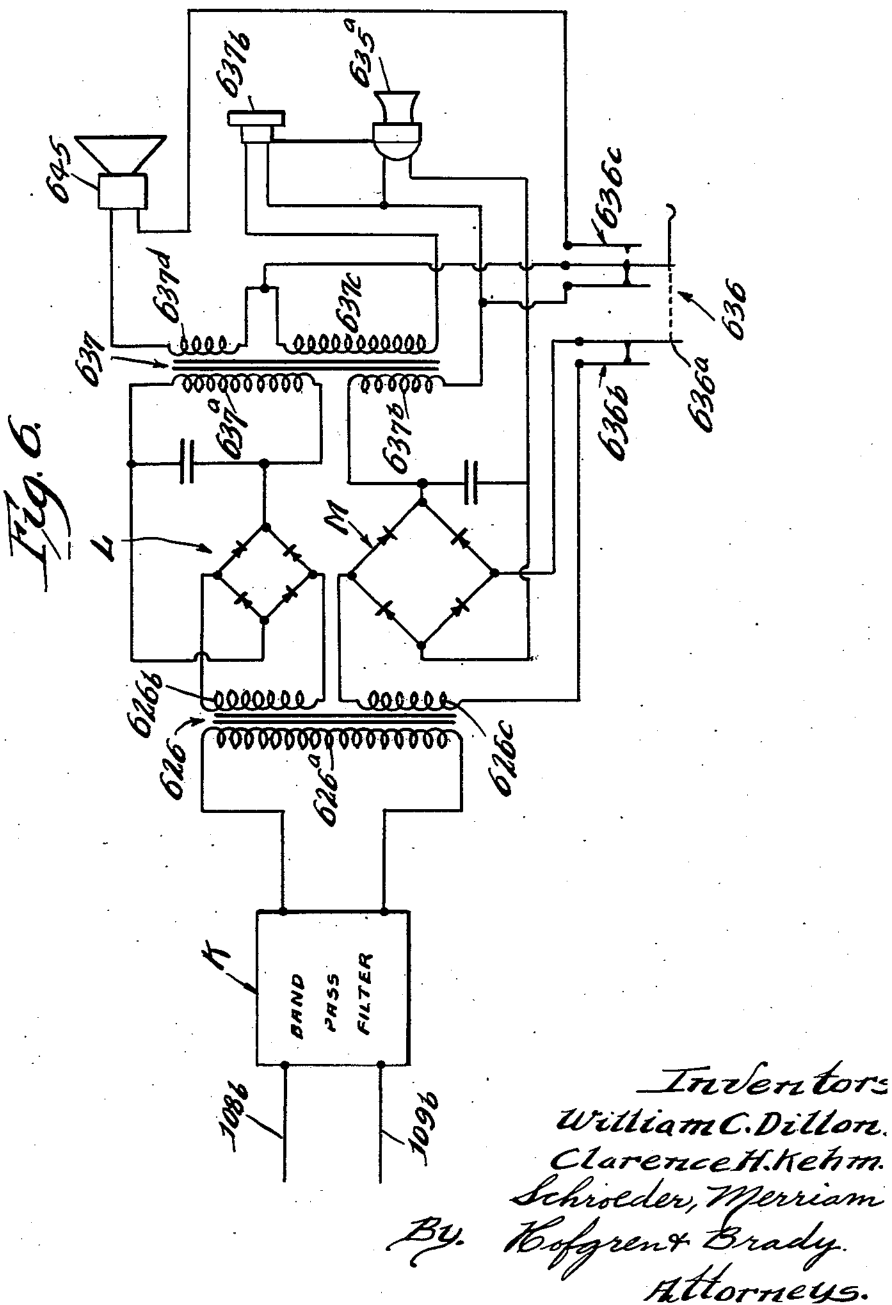
Fig. 6 is a circuit diagram of a modified form of subscriber's station unit utilizing a speaker for signaling.
Figure 7:
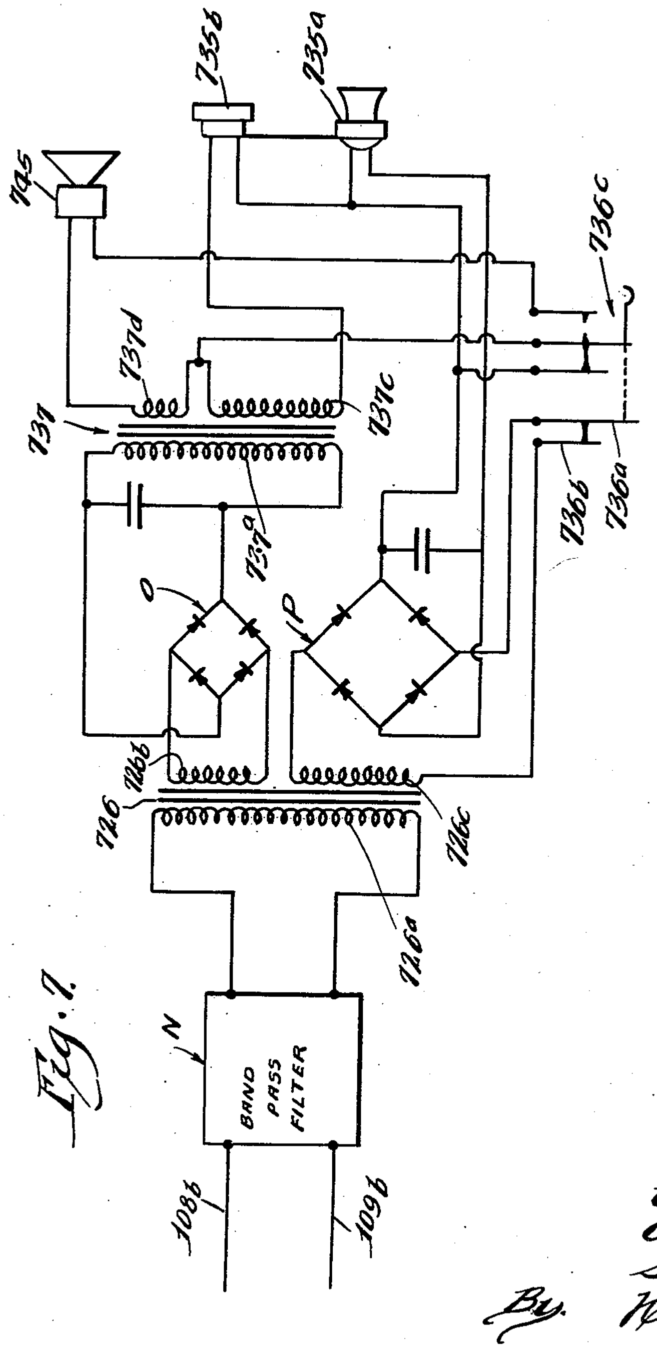
Fig. 7 is a circuit diagram of another form of subscriber's station unit having improved means for modulating the carrier wave on the transmission line.

Referring more particularly to Fig. 1, the particular embodiment of our invention illustrated here is shown as comprising a transmission line 1, a plurality of central station units 2a, 2b, 2c, etc., a plurality of subscriber's station units 3a, 3b, 3c, etc. and a substantially conventional connector unit #4 and switchboard 8. The central station units would all be identical except for the frequencies to which they would be tuned. One form of suitable central station unit is illustrated in Fig. 2 and will be more fully described hereafter. The subscriber's station units would also be identical except for the frequencies at which they are designed to operate, and representative subscriber's station units are illustrated in detail in Figs. 3, 6 and 7 and will be more fully described hereafter. Figs. 2, 3 and 6 illustrate central station and subscriber's station units adapted to operate in a system effecting indication on the central station switchboard by a change of circuit conditions between resonance and non-resonance; and Fig. 7 illustrates a subscriber's station unit adapted to effect the desired indication at the central station switchboard by a change of load conditions on the line.

The transmission line 1 might be a conventional rural party line comprising a pair of wires stretching across the countryside, preferably twisted every post or so to minimize interference. While such wires may be brought all the way into the central station if local interference is low, we prefer to have a portion of the line which is close to the central station in the form of a coaxial cable. Normally each such circuit or transmission line would have twenty or twenty-five, or possibly even thirty or more subscribers connected thereto, the three units illustrated in each case in Fig. 1 being representative of the large number used in practice. It will also be understood, of course, that the central station of a telephone system employing our system on its rural lines might also have conventional battery operated telephone circuits in the town handle from the same or adjacent boards; and toll line circuits leading to other cities either of the battery or carrier type.

The switchboard 8 would be of conventional type with a plurality of jack openings with grounded rings therearound as the rings 81a, 81b, 81c, etc., and associated indicating means in the form of conventional switchboard lamps 82a, 82b, 82c, etc. Associated with the openings would be a plurality of conventional jacks 83, 84 and 85 adapted to receive plugs, as the plugs 86 and 87 of a cord set. Inasmuch as the jacks and plugs are conventional, only one of each will be described in more detail.

Referring now more particularly to the jack 83 and the plug 86, it will be seen that the jack has spring terminals 83a and 83b adapted to be connected between tip and ring portions 86a and 86b, respectively, of the plug 86. The plug is provided with a conventional barrel or body portion 86c adapted to engage the grounded ring 81a; and the jack contains a terminal or contact member 83c which is separated from the contact 86b upon insertion of the plug. The contacts 83a and 83b are connected to central station unit #1 by wires 83a' and 83b' respectively and a wire 83c' leads from central unit #1 and is connected to contact 83c through a bus wire 88, the pilot light power supply battery 89, the bus wire 90, and the indicating lamp 82a.

Similar connections to the other units are made between these bus wires and the appropriate jacks and indicating lamps.

Each central station unit is connected to the two wires 1a and 1b of the transmission line by appropriate lines, as the connections 101a and 102a, for example. Conventional local sources of central station power, here indicated as batteries 91 and 92, provide anode, screen grid and filament supply power, bus wires from appropriate terminals of these sources being connected to each unit, as through the connecting wires 103a, 104a, 105a, 106a and 107a, the other units all having corresponding connecting wires.

Referring now more particularly to Fig. 2, a representative central station unit, as unit #2, designed to embody one form of carrier telephony embodying our inventions, will be described in more detail.

The source of continuous carrier waves of a desired frequency, as for example 23,000 c. p. s., is here illustrated as provided by an oscillator which employs a suitable tube 210, which may be of tube type No. 6L6, associated tuned circuits and connections. The tube is supplied with heater current through the filament supply leads 106b and 107b, and the cathode is grounded to the frame of the unit and to the common ground through the lead 105b. Plate supply voltage is delivered from wire 103b through the winding 211a of the coupling transformer 211 to the anode of the tube 210; and screen grid voltage is supplied from the lead 104b through the choke 212. The tube elements are coupled to a tank circuit comprising a coil 213 and main condenser 214 in parallel. A grid leak resistor 215 and condenser 216, and a by-pass condenser 217 complete the oscillator circuit illustrated, and the windings 211a and 211b of the coupling transformer are preferably tuned by shunt condensers 218 and 219.

The output of the continuously operating oscillator is delivered to connecting wires 101b and 102b, and thus to the transmission line, through filter A here shown as comprising a condenser 220, an inductance 221, another condenser 222 and another inductance 223 all in series with each other, and a shunt path connected between the wire 102b and a point between the coil 221 and condenser 222, this path comprising a condenser 224 and coil 225 in parallel.

For an oscillator adapted to operate at the representative frequency of 23,000 cycles with the particular tube type mentioned, the coils 212 and 213 might have inductances of 30 millihenrys and 20 millihenrys respectively; the condensers 214, 216 and 217 capacities of .0025, .001, and .05 microfarad; and the grid leak resistor 215 a value of 10,000 ohms. The coupling transformer windings 211a and 211b might have inductances of 24 and 3.8 millihenrys each, and be shunted by condensers 218 and 219 of .014 and .0015 microfarad each. The filter section should readily pass the particular predetermined carrier frequency, as 23,000 cycles, and about 100 cycles on each side, but substantially attenuate frequencies differing from the desired pass band, to avoid interference or shunting action between the various continuously operating carrier wave sources. We have found a satisfactory filter for the 23,000 cycle carrier unit being described as representative may have condensers 220 and 222 with a capacity of .0013 microfarad each, and a condenser 224 with a capacity of .31 microfarad; and coils 221 and 223 with an inductance of 39.8 millihenrys each, and a coil 225 with an inductance of .15 millihenry.

Another filter section B in the unit serves to make connection between the transmission line and the modulator-demodulator and rectifying units to be described shortly hereafter, this second filter section being here shown as comprising condensers 220', 222', and 224' and coils 221', 223', and 225', these corresponding in all respects to the elements of the first described filter A.

Connection is made from filter B to a winding 226a of a load coil or transformer 226 having additional windings 226b and 226c. In the particular unit being described, the winding 226a may have a value of 3.8 millihenrys and the windings 226b and 226c may have values of 2.2 and 15 millihenrys each respectively.

These windings are connected to two opposite corners or terminals of respective dry-plate diamond-connected rectifier arrangements here identified in general as C and D, thus providing arrangements operative for the desired purposes and requiring no local source of power, a factor of considerable importance in the subscriber's station units to be hereafter more fully described. The unit C is indicated as being somewhat smaller than the unit D as representative of that fact that the power capacity of the unit D, and thus its size, normally should be several times that of the unit C. The unit C operates as a modulator-demodulator in accordance with well known principles, sometimes being termed a "varistor." By having two of its opposite corners connected to the windings 226b and its other opposite corners connected to the winding 227a of an induction coil 227 having its other winding 227b connected to the wires 84a' and 84b' leading to the jack 84 (Fig. 1) the unit operates as a demodulator to convert the modulation waves of 23,000 c. p. s. modulated carrier wave reaching the transformer 226 into voice waves, or waves at voice frequency, to be delivered to the contacts 84a and 84b of the jack 84. Conversely, voice waves passing through the cord set and connector unit and being applied tc the winding 227 reflect a load variation and thus an impedance variation, back onto the carrier waves existing in the coil 226a, and thus by what is in effect a variation of secondary load, serving to modulate the carrier waves supplied to the transmission line. The other dry-plate diamond-connected arrangement D serves solely as a rectifier for rectifying a portion of the carrier wave energy to provide direct current energization for a conventional telephone-type relay here shown as having a winding 228a, movable contact members 228a, 228b and 228c and associated fixed contacts 228d and 228e. Any A. C. currents which might otherwise be present in the winding 228a are by-passed by a condenser 229 which may have a value of 25 microfarads; and an alternating current path is provided at all times between the wire 84b' and one end of the winding 227b by a condenser 230, which may have a value of 2 microfarads.

Referring next to the subscriber's station units, and more particularly to Figs. 1 and 3, it will be seen that each of these units is connected to the transmission line by suitable connecting wires, as wires 108a and 109a. Each subscriber's station unit includes a conventional microphone or telephone transmitter and receiver which may be combined in a single unit of the cradle type. Such a unit is supported by switch means when in inoperative position as illustrated schematically in Fig. 1, and the remaining parts of the subscriber's unit are of a size and type which may readily be built into the base of a conventional cradle phone installation to provide a modern unit at the subscriber's station.

Referring now more particularly to Fig. 3, and describing a representative subscriber's station (as subscriber's unit #2 of Fig. 1), the receiver-transmitter unit is here identified in general as 335 and comprises a transmitter or microphone 335a, which may be of the conventional carbon button type with a relatively quite low impedance, and a receiver here identified as 335b which may be of conventional type and which would preferably have an impedance of several hundred ohms. The switch means constituting the support for the receiver-transmitter set 335 is here indicated in general as 336, comprising movable member 336a serving as the support and carrying a movable contact adapted to engage a fixed contact 336b or to be separated therefrom, the contacts being shown closed as though the telephone equipment now being described were in use.

Connection to the connecting wires 108b and 109b, and thus to the transmission line, is through a filter E here shown as comprising condensers 320, 322 and 324 and incorporating inductances 321, 323 and 325. Inasmuch as this filter is here illustrated as being identical to the filter in the central station, analogous numerals are being used and this filter will not be described in more detail. It would be tuned to the same predetermined frequency at which the filters and oscillator of its corresponding central station unit are tuned, which frequency would be different from that of the frequencies employed for any other central station unit and subscriber's station unit on the same line or circuit.

The other side of the filter in the subscriber's station is connected to a winding of a coupling means or a transformer 326, this winding being identified as 326a and being shown as inductively coupled to other windings. One of these, here identified as the winding 326b, is shown as connected to a pair of opposite corners or terminals of a dry-plate diamond-connected arrangement identified in general as F, this unit having its other corners or pair of terminals connected to a winding 337a of an induction coil or coupling means 337. The unit F serves as a modulator-demodulator unit and is analogous to the unit C in the corresponding central station. The other winding 326c of the transformer 326 has one side connected to one corner of a dry-plate diamond-connected rectifying arrangement here indicated in general as G, the opposite corners or terminals being connected through the switch means 336 to the other side of the winding 326c, so that this circuit is completed only when the hand set 335 is off the support provided by the switch means. The other pair of terminals of the rectifying means G (the direct current terminals) are connected to a circuit having winding 337b and the carbon button of the microphone 335a in series. It will thus be apparent that when the hand set 335 is picked up the switch means completes a circuit to the microphone and a portion of the carrier waves passing through the filter E are rectified and provide a DC source of energizing current for the microphone. Since the modulator-demodulator unit F and the rectifying unit G are of a character requiring no local power supply and since the rectifying means converts part of the carrier wave power originally from the central station into power usable to energize the microphone no local power supply of any kind is necessary in connection with the subscriber's telephone equipment; that is the subscriber need not have commercial power in his home, nor does either he or the telephone company have to provide battery power at the subscriber's station.

The receiver 335b is connected in an independent circuit to the winding 337c, so that modulated carrier waves passing through the filter E and demodulated by the unit F serve to vibrate the diaphragm of the receiver in the desired pattern. All receivers are preferably of a single predetermined type so that the period of mechanical resonance of the receiver diaphragm is at some predetermined frequency in the audible range, as for example 400 cycles per second. The mechanical resonance is not so great as undesirably to distort voice waves, but it does provide a predetermined frequency at which the receiver can be made to "howl" for signaling the subscriber in lieu of ringing a bell. The provision of three windings on the transformer 337 is of considerable importance, as it enables the widely differing impedances of the output modulator-demodulator F, the microphone 335a, and the receiver 335b to be individually matched for most efficient operation. Sound waves reaching the diaphragm of the microphone 335a, when a subscriber speaks into the microphone vary the resistance of the carbon button in conventional manner and thus vary the amount of current in the microphone circuit to set up electrical voice waves corresponding to the sound waves. The transformer action between windings 337a and 337b transfers these voice waves to one pair of terminals of the modulator-demodulator unit F, resulting in reflecting back an effective resistance change causing substantial effective load variations in the winding 326b to effect modulation of the carrier waves present in the winding 326a; and this modulation action is aided by the variation in current drawn from the rectifying means G, reflected back to the winding 326c. The result is that the particular carrier wave present in the winding 326a (23,000 c. p. s.) as described would be modulated while no other carrier waves present on the transmission line would be affected, the filter E providing isolation from these carriers.

While the central station and subscriber's units just described as representative of one embodiment of our invention have been illustrated as employing a tube oscillator arrangement, inductive-capacitative filters, modulator-demodulator and rectifying means of the conventional copper oxide type, as making use of a cradle phone, and the like, it will be understood that these are merely illustrative of one method of accomplishing our improved operation. The tube oscillator could be replaced by a motor generator arrangement or any other means of providing carrier waves of the desired frequency; the filters can be of crystal or other suitable types, the rectifying means could be a cold cathode tube or other appropriate means requiring no local power supply, the switch means can be manually operated if desired, etc.

Figure 4:
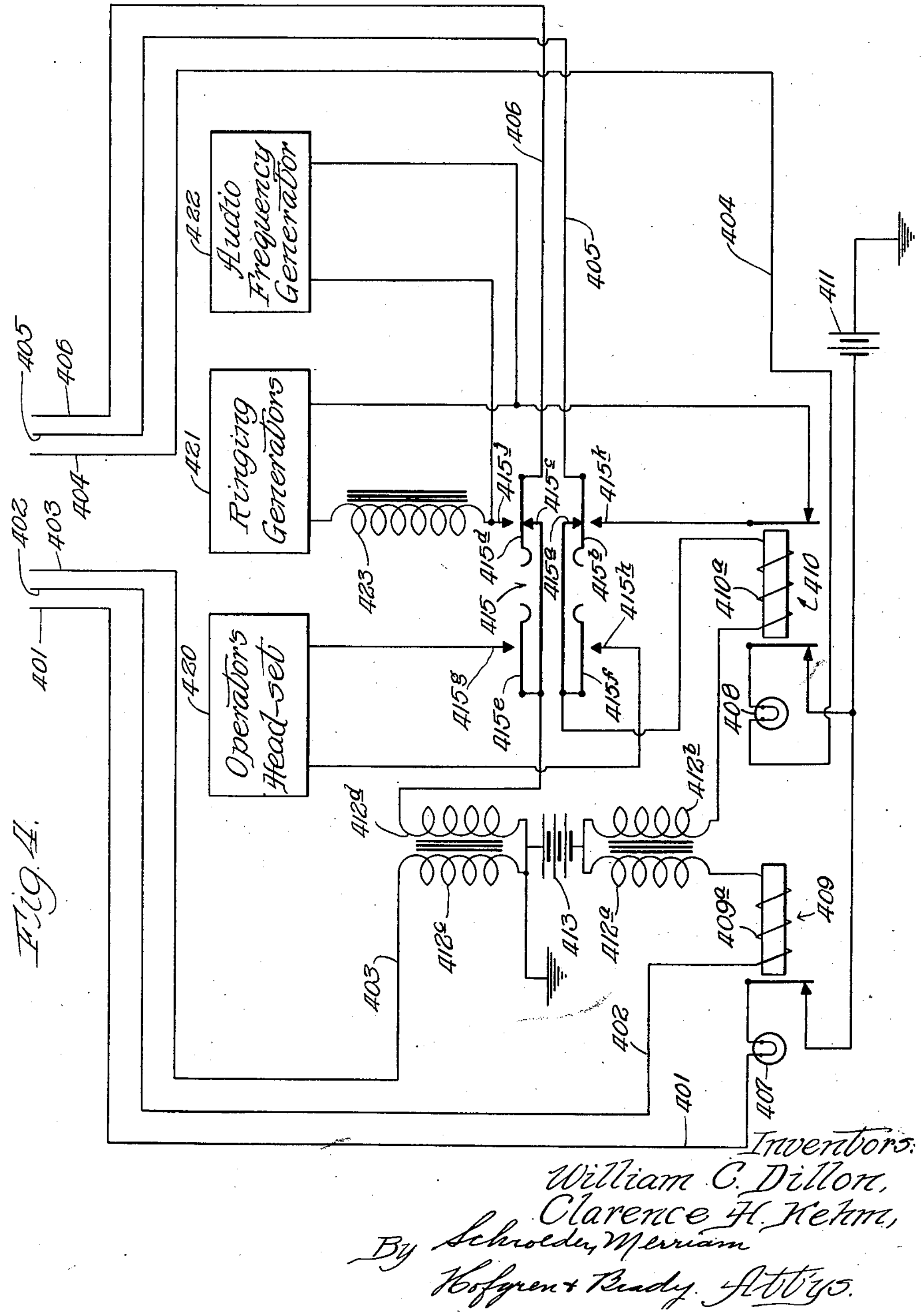
Fig. 4 is a circuit diagram of a connector unit for the system shown in Fig. 1.

Referring now more particularly to Fig. 4, a connector unit adapted to be associated with a pair of conventional switchboard cords and to make connection between two stations will be described, the description being kept brief inasmuch as the connector is conventional with the exception of our signaling or calling arrangement. Wires 401, 402 and 403 are here shown as connected to the shell, ring and tip, of plug 87 of a pair of cords, the corresponding plug 86 having wires 404, 405 and 406 connected thereto. Wires 401 and 404 are each connected to one side of the respective signal lamps 407 and 408 associated with the cords at the base of the switchboard, and energizing circuit for these lamps being completed through the contacts of relays 409 and 410 respectively, and a common battery 411 to ground, so that these lamps are illuminated when the plugs are in and the relays are deenergized. The energization coil 409*a* of the relay 409 has one side connected to the wire 402 and the other side connected to winding 412*a* of a repeater coil 412 and a common battery 413 to ground, the repeater coil permitting the use of common battery for several circuits without interference. The other winding 412*b* of the repeater coil is connected to one side of the winding 410*a* of the relay 410, the other side of this relay being connected to a contact 415*a* of switch 415 of conventional switchboard type, a circuit being closed from a switch element 415*a*, when the key is in central or neutral position, to the element 415*b* and thus to the cord wire 405. Cord wire 403 is connected to winding 412*c* of the repeater coil, the other winding 412*d* of this coil being connected to another element 415*c* of the cam switch, this element normally being in contact with the element 415*d*, to complete a circuit through the other cord wire 406.

Movement of the cam switch in one direction, in accordance with conventional practice, effects engagement of the movable contact members 415*e* and 415*f* with the closed contacts 415*g* and 415*h* to place the operator's headset 420 (i. e. microphone and receiver) in circuit with the wires 403 and 406 on the one hand and 402 and 405 on the other hand so that the operator may speak with the subscriber on either cord. On the other hand movement of the cam switch in the other direction separates the contact elements 415*b* and 415*d* from the contacts 415*a* and 415*c* and brings them into engagement with contact 415*j* and 415*k* to effect signaling to the subscriber connected to cord wires 405 and 406, the plug connected to cords 404, 405 and 406 being the calling plug and the other plug being the answering plug when a light first comes up on the switchboard.

The signaling means which we provide the operator to handle calls on our telephone circuits or to conventional circuits without any difference in procedure comprises a conventional ringing generator 421 and an additional audio frequency generator 422 in parallel therewith. The conventional ringing generator will provide waves at a subaudible frequency (as for example in the range from 16–60 cycles per second) adapted to ring the bell in the home of a subscriber on a conventional battery telephone circuit. The audio frequency generator 422 should provide waves of considerable power at the predetermined resonant frequency of the receiver in subscriber's stations embodying our invention, as 400 cycles per second in the particular example described. This generator may comprise a tuning fork electrically driven and having its waves amplified by a conventional audio amplifier, a motor-generator set providing waves of this frequency, or any other suitable source, the audio frequency generator 422 being of relatively high impedance, as the output circuit of a tuning fork actuated amplifier mentioned above. The ringing generator 421, on the other hand, would be a very low impedance and we prevent shorting out these generators with respect to each other by deliberately making the audio frequency generator 422 of such high impedance so as not to provide a short on the output of the ringing generator, and by putting an audio frequency choke 423 in one lead of the ringing generator, this providing high impedance to the waves of the generator 422 and passing the waves of the generator 421. By this dual arrangement the operator may plug in the plug 86 on a jack connected to one of our carrier lines or to a conventional telephone circuit connected to the same or an adjoining section of the switchboard and push the cam switch forward to effect signaling or calling on either line, the bell being rung on a conventional circuit and the receiver being vibrated at resonance on one of our carrier systems.

While the condensers in the subscriber's station units and central station units illustrated and described as representative are indicated schematically as fixed condensers inasmuch as they operate as fixed condensers, it will be understood that in practice some or all of these condensers, particularly those associated with the filters and coupling transformers, are provided with variable trimmer condensers or made partially variable for initial adjustment. Not only must the filter be adjusted to the desired carrier wave frequencies as part of the initial stages of production, or during installation, but also the entire transmission line and any particular pair of cooperating units are so tuned (this sometimes requiring an additional variable condenser across the two wires of the transmission line) that the whole circuit is resonant to the particular carrier frequency of those units when the hand set is picked up at the subscriber's end; and non-resonant when the switch 336 is open by reason of the hand set being in place on the base, at least in the system now first being described. In this system the non-resonant conditions existing whenever communication is to be provided between a particular pair of cooperating units results in relatively low amplitude carrier waves of this particular carrier frequency. On the other hand, for example, if the subscriber at station #3 picks up his hand set the closing of his switch sets up resonant conditions for his particular carrier frequency, 27,000 cycles in the particular example mentioned earlier, and carrier waves of this frequency immediately assume much greater amplitude on the line. Inasmuch as the filter of central station unit #3 is the only one which passes these particular carrier waves, only this central station unit is affected by this change in carrier wave amplitude. However, in central station unit #3 the relay 228, which has had its contacts open, is energized with sufficient power to cause closing of its contacts, this resulting in illumination of the indicating lamp 82c on the switchboard. That is, the relay 228 is made of a sensitivity such that its contacts are opened when the carrier waves to which this unit responds are at the lower amplitude associated with non-resonance to this particular frequency; and such that its contacts close when the carrier waves reach the higher amplitude associated with resonant conditions. The operator would then insert the answering plug 87 in the jack associated with the lamp 82c, this immediately breaking the circuit of this indicating lamp, transferring the indication to the lamp 407. The operator would then throw her headset in by the cam switch and determine the call which subscriber #3 desired to complete, the conversation taking place by modulation and demodulation of the 27,000 cycle carrier, as described heretofore, so that the communication is completely private. If it be assumed that subscriber #3 desired to talk to subscriber #1, the operator would then insert plug 86 in jack 83 and throw the ringing key forward to effect vibration of the receiver diaphragm at subscriber's station #1. While central station unit #1 and the associated transmission line would not be resonant to the 19,000 cycle carrier associated with unit #1 under these conditions, since the hand set of subscriber #1 is still in place and the switch open, plenty of power for effecting a loud audible indication can be achieved by having the audible frequency generator 422 of sufficient power to effect a very high percentage of modulation of carrier #1, as 80% or 90% modulation. When subscriber #1 responds to the signal and picks up his hand set the baseboard indicating lights associated with the switchboard and the particular pair of cords being used are extinguished in the conventional manner by energization of the connector unit relays, and the conversation then proceeds in the manner which has heretofore been described, both carrier wave #1 and carrier wave #3 being utilized, with demodulation from one of these waves and modulation upon the other taking place at the central station, depending on which subscriber is speaking.

As has been mentioned heretofore, subscriber #3 can be connected with equal ease to a conventional battery telephone circuit or to a toll line. When either subscriber hangs up the change of conditions associated with his carrier wave from resonance to non-resonance reduces the amplitude of the waves in his central station unit and this results in opening of the relay 228, this in turn deenergizing one of the connector unit relays 409 or 410 (depending upon which subscriber hangs up first) and illumination of the associated indicator lamp, calling the operator's attention to the face that one or both of the cords should be pulled out.

Instead of resonating the receiver diaphragm to cause a "howl" for signaling purposes a speaker may be utilized as shown in Figs. 6 and 7. The use of a speaker eliminates the necessity for selecting receivers having diaphragms which are resonant at a predetermined frequency and permits the use of a variable tone for signaling, this tone being more attention-compelling.

Referring to Fig. 6, transmission line wires 108b and 109b lead to the input of a band pass filter K which may be similar to the filter F of Fig. 3, and the output terminals of the filter are connected across a coil 626a which forms part of an input transformer 626 for the subscriber's station. Another coil 626b of this transformer is connected across two terminals of a modulator-demodulator L which may be similar to the unit F of Fig. 3, the other terminals of this modulator-demodulator being connected across winding 637a of the induction coil or coupling means 637. Another winding 637c of the coil 637 has the receiver 635b connected thereacross, this connection being similar to those of Fig. 3 except that the connection is through switch elements 636c which comprise a single pole double throw switch, the movable pole of which is ganged with the movable pole 636a of the hook switch earlier described and is operated by the cradle-type telephone unit.

As in Fig. 3, a winding 626c of the coupling means 626 is connected across two terminals of a rectifier M, which is similar to the rectifier G of Fig. 3, this connection including the switch elements 636a and 636b. The opposite terminals of rectifier M are connected to the transmitter 635a, this connection including in series the winding 637b.

Another winding 637d associated with the coupling means 637 has one end connected to one terminal of a loudspeaker 645, and the other terminal of the speaker is connected to the other end of the winding 637d through the other stationary contact of the single pole double throw switch 636c. As shown, the movable pole of this switch is connected to both windings 637c and 637d. In addition to providing a speaker for signaling purposes together with an additional winding for operating the speaker, Fig. 6 shows a switching arrangement such that when the telephone unit is on the hook or cradle switch 636 the receiver winding 637c of the audio transformer 637 is disconnected from the receiver, while the loudspeaker winding 637d is connected to the loudspeaker 645, this being a position other than that illustrated in the drawing. When the receiver and the transmitter are removed from the hook switch (which is schematically illustrated in Fig. 6) the loudspeaker is disconnected from its actuating winding 637d and the receiver 635b is connected across its winding 637c.

In a cradle-type phone unit the dial apparatus may be removed and the speaker 645 substituted in place thereof.

Figure 8:
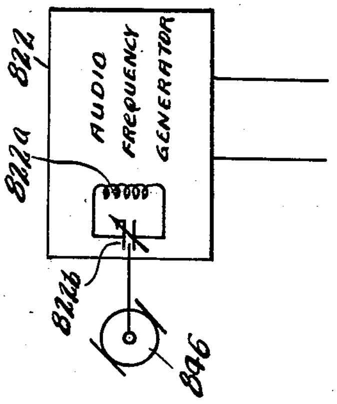
Fig. 8 is a schematic illustration of an arrangement to provide a signal tone of varying frequency.

In addition to eliminating the necessity for specially selecting the receiver parts, another advantage obtained in using a speaker is that a variable signaling tone may be used, such a tone being more attention-compelling than a single frequency tone such as a 400 cycle tone as earlier described. Fig. 8 illustrates schematically an arrangement for producing such a variable tone, and in the event it is desired to use this apparatus, the apparatus of Fig. 8 is substituted for the audio frequency generator 822 of Fig. 4, the connections being the same in both cases. The variable audio frequency generator may include a tank circuit schematically illustrated as comprising an inductance 822a and variable condenser 822b. A motor 846 is provided to vary the condenser 822b continuously between upper and lower capacitance limits to change the frequency of the oscillator within audible limits, as for example a range of 200–1000 c. p. s. Preferably the generator includes an audio amplifier to provide sufficient power for signaling purposes. The generator is connected in parallel with a conventional ringing generator so as to be operated simultaneously therewith as shown in Fig. 4.

Fig. 7 shows a novel method of modulation of the transmission line from the subscriber's station. In order to keep the description brief, but fully understandable, analogous parts will be given analogous reference numerals except that the first numeral will be that of the figure being described rather than that of Figs. 1–4 or 6, to which they are analogous. Transmission line wires 108b and 109b are connected to a band pass filter N, the output terminals of which are connected to a winding 726a of a coupling transformer 726. Another winding 726b of this transformer is connected across the two terminals of the modulator-demodulator means O, the other terminals of the modulator-demodulator being connected across a winding 737a of an audio transformer 737. This transformer has a winding 737c connected to the receiver 735b through the double pole switch 736c when the hand set is off the hook and the transformer has another winding 737d connected across a speaker 745 through said switch 736c when the hand set is on the hook, all of these connections being similar to those of Fig. 6.

Another winding 726c of the transformer 726 is connected across two opposite terminals of the rectifier P through switch contacts 736a and 736b, these connections also being similar to those of Fig. 6.

In Fig. 7 there is no transmitter winding on the audio transformer 737, and instead the transmitter is connected directly across two terminals of the rectifier P. Modulation is effected by the voice impulses which vary the resistance of the carbon button in the microphone 735a, thereby changing the load reflected into the winding 726c of the carrier frequency transformer 726 and resulting in amplitude modulation of the carrier frequency in the transmission line.

Figure 5:
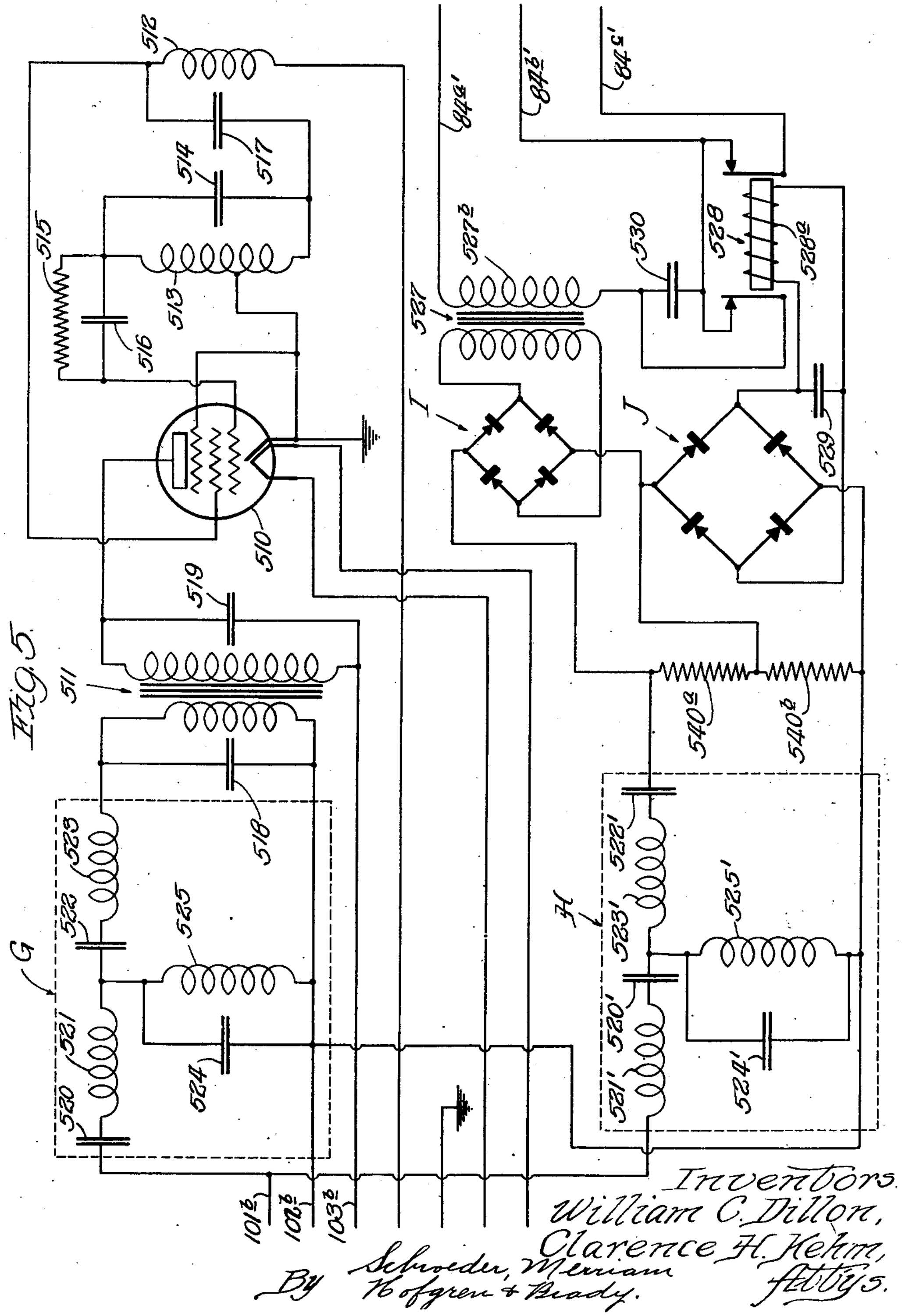
Fig. 5 is a circuit diagram of another form of central station unit which may be used in the system shown in Fig. 1.

While the system of Figs. 1–4 makes use of change of circuit conditions between resonance and non-resonance for effecting variations in the actuating relay for the indicating lamp at the central station, our system may be operated if desired without any relation to resonant conditions. Figs. 5, 6 and 7 illustrate central station and subscriber's station units in a system effecting the desired indication by change in load conditions, and this other embodiment of the invention will be described with particular reference to these three figures.

Referring first more particularly to Fig. 5, filter sections G and H are again shown as of the capacitative-reactive type, analogous to filters A and B, and would be tuned to the predetermined carrier frequency of this unit, as for example, 23,000 cycles. An oscillator again comprises the tube 510, the associated tank circuit comprising a coil 513 and condenser 514, and associated circuit elements such as the choke 512, the by-pass condenser 517, and the grid leak resistor 515, and condenser 516. This would again comprise a wave generator of predetermined frequency (as 23,000 cycles), and would be coupled to the filter G by the tuned transformer 511 having its windings shunted by the condensers 518 and 519.

A portion of the carrier wave of the frequency of this particular unit is again applied to the filter H and through it to the modulator-demodulator unit I and the rectifying unit J. As before, the modulator-demodulator means is connected through a coupling means or transformer 527 to the two main contacts of the jack associated with this unit; and the rectifying means J is connected to the energizing coil 528a of a double relay 528 serving to control the indicating lamp associated with the corresponding jack on the switchboard, and to transfer indication to the cord lights when appropriate.

The difference between the unit shown in Fig. 5 and that shown and described in some detail in Fig. 2 resides primarily in the coupling means between the lower filter section and the units I and J. In the unit now being described the right hand end of the filter section H (speaking with respect to the positions as viewed in Fig. 5) is connected to a coupling resistor 540 comprising an upper section 540a and a lower section 540b, a suitable value for these being 1,000 ohms each to provide a total coupling resistance of 2,000 ohms. As will be apparent from a glance at the circuit diagram of Fig. 5, one-half of the output voltage existing across the filter H at any particular time is applied to the modulator-demodulator unit I, and the other one-half to the rectifying unit J. The second difference between the unit here being described and that shown in Fig. 2 and described earlier resides in the arrangement of contacts of the relay 528, this relay being so arranged that its contacts are normally closed and are opened by energization of the coil 528a above a certain level of energy, as distinguished from the relay 228 where the contacts were closed by increase in the current flow through the energizing coil.

In this form of the invention the energizing levels provided by carrier wave supplying means are made sufficiently high that the portion supplied to the rectifying means J in the central station unit of Fig. 5, when the hand set of the corresponding subscriber's set is on the hook (636 in Fig. 6 and 736 in Fig. 7) is sufficient to provide enough current through the actuating coil 528a of the relay 528 to keep the movable contacts of the relay both separated from their associated fixed contacts. Inasmuch as there is less load on the line, the line voltage is higher and the relay remains closed. When the hand set is lifted from its support in the subscriber's station the load is increased since the switch contacts 636a and and 636b are closed and the secondary portions of the carrier frequency transformer form part of a closed circuit, as do the rectifier, the audio transformer, and the elements of the hand set. This results in a substantial decrease in amplitude of the particular carrier waves involved, resulting in decreased energizing current in the actuating coil 528a so that the relay becomes deenergized and the movable contact members drop away from the energizing coil and into engagement with their associated fixed contacts causing an indicating light to come up on the switchboard over the corresponding jack. Only the central station unit associated with one subscriber's unit is actuated because only one central station unit is affected by carrier waves of that particular frequency. Operation of the system is thereafter similar to that heretofore described, and when the call is completed opening of the hook switch contacts 636a and 636b in the subscriber's unit results in an increase in current in the energizing coil 528a of the corresponding central station unit, energizing the relay providing an indication on one of the cords that the conversation is completed.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a telephone system: a transmission line; means coupled to said line at one end thereof for supplying carrier waves to said line; telephone equipment coupled to said line at a point spaced from said end, this equipment including demodulating means; and signalling means comprising a transducer coupled to said demodulating means and means for actuating said transducer, this last mentioned means being at said end of said line and being adapted to supply audio frequency signalling waves for modulating said carrier waves on said line to actuate said transducer to provide an audible signal at said audio frequency.

2. In a telephone system: a transmission line; means coupled to said line at one end thereof for supplying carrier waves to said line; telephone equipment coupled to said line at a point spaced from said end, this equipment including demodulating means; and signalling means comprising a transducer coupled to said demodulating means and means for actuating said transducer, this last mentioned means being at said end of said line and being adapted to supply two sources of waves in parallel, one source providing audio frequency waves for modulating carrier waves on said line to actuate said transducer to provide an audible signal at said audio frequency and the other source providing waves of a sub-audible frequency.

3. In a telephone system: a first transmission line; a second transmission line; means for transmitting voice waves on said first line, this means including carrier waves; means for transmitting voice waves on said second line, this means including a direct current source directly connected to said second line; telephone equipment connected to said first line, this equipment including demodulating means; and signalling means comprising a transducer coupled to said demodulating means and means for actuating said transducer, this last mentioned means being selectively connectable to either line and comprising two sources of waves in parallel, one source providing audio frequency signalling waves for modulating said carrier waves on said line to actuate said transducer to provide an audible signal at said audio frequency and the other source providing waves of a lower conventional ringing frequency.

4. In a telephone system: a transmission line; means coupled to said line at one end thereof for supplying carrier waves to said line; telephone equipment coupled to said line at a point spaced from said end, this equipment including a receiver and demodulating means; and signalling means at said end of said line for supplying audio frequency signalling waves for modulating said carrier waves on said line for causing said receiver to resonate.

5. In a telephone system: a transmission line; means at one end of said line for supplying carrier waves to said line; telephone equipment connected to said line at a point spaced from said end, this equipment including a receiver and demodulating means, said receiver having a predetermined resonant frequency higher than conventional ringing frequency; and signalling means comprising two sources of waves in parallel, one source providing modulation of said carrier waves with waves of said predetermined frequency for causing said receiver to resonate and the other providing waves of a lower frequency.

6. In a telephone system: a first transmission line; a second transmission line; means for transmitting voice waves on said first line, this means including carrier waves; means for transmitting voice waves on said second line, this means including a direct current source directly connected to said second line; telephone equipment connected to said first line, this equipment including a receiver and demodulating means, said receiver having a predetermined resonant frequency higher than conventional ringing frequency; and signalling means selectively connectable to either line, this means comprising two sources of waves in parallel, one source providing modulation of said carrier waves with waves of said predetermined frequency for causing said receiver to resonate and the other providing waves of a lower frequency.

7. In a telephone system: a first transmission line; a second transmission line; means for transmitting voice waves on said first line, this means including carrier waves; means for transmitting voice waves on said second line, this means including a direct current source directly connected to said second line; telephone equipment connected to said first line, this equipment including a receiver and demodulating means, said receiver having a predetermined resonant frequency higher than conventional ringing frequency; and signalling means selectively connectable to either line, said means comprising two sources of waves in parallel, one source providing modulation of said carrier waves with waves of said predetermined frequency for causing said receiver to resonate and the other providing waves of a lower conventional ringing frequency, and a choke coil in series with said lower wave source.

8. In a telephone system: a transmission line; means at one end of said line for energizing said line with crrier waves; telephone equipment connected to said line at a point spaced from said end, this equipment including a receiver and demodulating means, said receiver having a predetermined resonant frequency higher than conventional ringing frequency; and signalling means comprising two sources of waves in parallel, one source providing modulation of said carrier waves with waves of said predetermined frequency for vibrating said receiver at its resonant frequency and the other providing waves of a lower conventional ringing frequency, and a choke coil in series with said lower wave source.

9. In a telephone system; a first transmission line; a second transmission line; means for transmitting voice waves on said first line, this means including carrier waves; means for transmitting voice waves on said second line, this means including a direct current source directly connected to said second line; telephone equipment connected to said first line, this equipment including a receiver and demodulating means, said receiver having a predetermined resonant frequency in the audible range; telephone equipment connected to said second line, this equipment including a bell; connecting means adapted to be selectively connected to either line; and signalling means connected to said connecting means, this means comprising two sources of waves in parallel, one source being of relatively high impedance and providing modulation of said carrier waves with waves of said predetermined frequency for vibrating said receiver at its resonant frequency and the other source providing waves of a sub-audible frequency adapted to actuate said bell, this other source having a choke coil in series therewith.

10. In a telephone system: a transmission line; means coupled to said line at one end thereof for supplying carrier waves to said line; telephone equipment coupled to said line at a point spaced from said end, this equipment including demodulating means; and signalling means comprising a loud speaker coupled to said demodulating means, and means at said end of said line for supplying audio frequency signalling waves for modulating said carrier waves on said line to actuate said speaker.

11. Apparaus of the character claimed in claim 10, wherein said audio frequency waves are of a constant, predetermined frequency.

12. Apparatus of the character claimed in claim 10, wherein said audio frequency waves are constantly varying in frequency between predetermined high and low audible limits.

13. In a telephone system: a first transmission line; a second transmission line; means for transmitting voice waves on said first line, this means including carrier waves; means for transmitting voice waves on said second line, this means including a direct current source directly connected to said second line; telephone equipment connected to said first line, this equipment including demodulating means; and signalling means comprising a loud speaker coupled to said demodulating means, and means selectively connectable to either line and comprising two sources of waves in parallel, one source providing audio frequency signalling waves to actuate said speaker and the other providing waves of a lower conventional ringing frequency.

14. In a telephone system: a first transmission line; a second transmission line; means for transmitting voice waves on said first line, this means including carrier waves; means for transmitting voice waves on said second line, this means including a direct current source directly connected to said second line; telephone equipment connected to said first line, this equipment including demodulating means; and signalling means comprising a loud speaker coupled to said demodulatng means, and means selectively connectable to either line and comprising two sources of waves in parallel, one source providing audio frequency signalling waves to actuate said speaker and the other providing waves of sub-audible conventional ringing frequency, and a choke coil in series with said lower wave source.

15. Apparatus of the character claimed in claim 14, wherein said audio frequency waves are constantly varying in frequency between predetermined high and low audible limits.

16. Apparatus of the character claimed in claim 14, wherein said audio frequency waves are constantly varying in frequency between high and low audible limits of the order of 1000 cycles per second and 200 cycles per second respectively.

17. In a telephone system: a first transmission line; a second transmission line; means for transmitting voice waves on said first line, this means including carrier waves; means for transmitting voice waves on said second line, this means including a direct current source directly connected to said second line; telephone equipment connected to said first line, this equipment including demodulating means and a receiver; telephone equipment connected to said second line; this equipment including a bell; connecting means adapted to be selectively connected to either line; and signalling means comprising a loud speaker coupled to said demodulating means, and means connected to said connecting means and comprising two sources of waves in parallel, one source being of relatively high impedance and providing audio frequency signalling waves to actuate said speaker and the other source providing waves of a sub-audible frequency adapted to actuate said bell, this other source having a choke coil in series therewith.

18. Apparatus of the character claimed in claim 17, wherein the loud speaker is adapted to be mounted in the base of a conventional cradle type telephone unit, and wherein said audio frequency waves are constantly varying in frequency between high and low audible limits of the order of 1000 cycles per second and 200 cycles per second respectively.

19. Apparatus of the character claimed in claim 17, including a circuit having switch means for coupling said receiver to said demodulating means and decoupling said speaker therefrom when in one position, and for decoupling said receiver from said demodulating means and coupling said speaker thereto when in another position.

20. In a telephone system: a transmission line; means coupled to said line at one end thereof for supplying carrier waves to said line; telephone equipment coupled to said line at a point spaced from said end, this equipment including demodulating means, a rectifier, and a microphone connected directly across two terminals of said retifier; and signalling means comprising a transducer coupled to said demodulating means and means for actuating said transducer, the last mentioned means being at said end of said line and being adapted to supply audio frequency signalling waves for modulating said carrier waves on said line to actuate said transducer to provide an audible signal at said audio frequency.

21. In a telephone system: a transmission line; a central station at one end of the line having therein telephone equipment including means for supplying to said line a plurality of carrier waves of different frequencies; and a plurality of subscriber's units connected to said transmission line at points spaced from the central station, each such unit including a filter connected to said line, a microphone, a receiver, rectifying means for rectifying a portion of said carrier waves to provide a D. C. energizing supply for said microphone, a circuit connecting the input of said rectifying means to said line through said filter, leads connecting the output of said rectifying means directly to said microphone, variations in the resistance of the microphone similarly varying the load on said line to effect amplitude modulation of the carrier waves to which the filter is tuned and a dry-plate diamond-connected demodulator device coupled to said line through said filter and coupled to said receiver for demodulating carrier waves on the line for actuating said receiver, the filters in each unit being tuned to a different frequency.

22. In a telephone system: a transmission line; means at one end of said line for supplying carrier waves to said line; and telephone equipment connected to said line at a point spaced from said end, this equipment including a microphone, cold rectifying means for rectifying a portion of said carrier waves to provide a direct current energizing supply for said microphone, a circuit connecting the input of said rectifying means to said line, and leads connecting the output of said rectifying means directly to said microphone, variations in the resistance of the microphone similarly varying the load on said circuit to effect amplitude modulation of said carrier waves.

23. In a telephone system: a transmission line; a central station at one end of the line having therein a plurality of units each including filter means connected to said line, means for supplying carrier waves through said filter means to said line, modulating and demodulating means coupled to said line through said filter means, the carrier wave supplying means and filters in each unit being tuned to a different frequency, indicating means, and actuating means for said indicating means; and a plurality of subscriber's units connected to said transmission line, each such unit including a filter connected to the line, a transformer having one winding connected to said filter, a microphone, a receiver, and rectifying means having its input connected to another winding of said transformer and its output connected directly to said microphone for rectifying a portion of said carrier waves to provide a direct current energizing supply for said microphone, variations in the resistance of said microphone similarly varying the load on said transformer to effect amplitude modulation of the carrier waves to which the filter in the subscriber's unit is tuned.

WILLIAM C. DILLON.
CLARENCE H. KEHM.

REFERENCES CITED

The following references are of record in the file of this patent:

UNITED STATES PATENTS

| Number | Name | Date |
|---|---|---|
| 1,662,966 | Foley | Mar. 20, 1928 |
| 1,821,758 | Konn | Sept. 1, 1931 |
| 1,896,487 | Gibson | Feb. 7, 1933 |
| 1,975,932 | Fox | Oct. 9, 1934 |
| 2,044,305 | Johnson | June 16, 1936 |
| 2,064,907 | Green | Dec. 22, 1936 |
| 2,440,239 | Almquist | Apr. 27, 1948 |
| 2,449,391 | Kogane | Sept. 14, 1948 |
| 2,489,202 | Selinger | Nov. 22, 1949 |
| 2,510,271 | Almquist | June 6, 1950 |
| 2,518,374 | Rhoads | Aug. 8, 1950 |